(12) United States Patent
Watase

(10) Patent No.: US 9,862,304 B2
(45) Date of Patent: Jan. 9, 2018

(54) VEHICLE LIGHTING CONTROL SYSTEM

(71) Applicant: Mazda Motor Corporation, Aki-gun, Hiroshima (JP)

(72) Inventor: Hiroyuki Watase, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/383,942

(22) Filed: Dec. 19, 2016

(65) Prior Publication Data

US 2017/0232884 A1    Aug. 17, 2017

(30) Foreign Application Priority Data

Feb. 15, 2016    (JP) .................................. 2016-025736

(51) Int. Cl.
| | |
|---|---|
| *B60Q 1/02* | (2006.01) |
| *B60Q 1/14* | (2006.01) |
| *H05B 37/02* | (2006.01) |
| *B60Q 1/00* | (2006.01) |
| *G09G 5/10* | (2006.01) |

(52) U.S. Cl.
CPC ......... *B60Q 1/1423* (2013.01); *B60Q 1/0076* (2013.01); *G09G 5/10* (2013.01); *H05B 37/0218* (2013.01); *G09G 2310/0237* (2013.01); *G09G 2320/0646* (2013.01)

(58) Field of Classification Search
CPC ...... B60C 1/1423; B60C 1/143; B60C 1/1446
USPC ............................. 315/77, 82; 307/10.1, 10.8
See application file for complete search history.

(56) References Cited

U.S. PATENT DOCUMENTS

| | | | | |
|---|---|---|---|---|
| 8,843,272 B2* | 9/2014 | Okita | .................... | B60W 30/20 701/36 |
| 2006/0239016 A1* | 10/2006 | Woo | ........................ | B60Q 3/16 362/459 |
| 2015/0130853 A1* | 5/2015 | Hada | .................... | H04N 9/3155 345/690 |
| 2015/0175054 A1* | 6/2015 | Yatsuda | ............... | G02B 26/105 362/465 |
| 2015/0199041 A1* | 7/2015 | Salter | ..................... | G06F 3/042 345/174 |

(Continued)

FOREIGN PATENT DOCUMENTS

JP    2005145115 A    6/2005

*Primary Examiner* — Tung X Le
(74) *Attorney, Agent, or Firm* — Alleman Hall Creasman & Tuttle LLP

(57) ABSTRACT

A vehicle lighting control system for controlling headlights of a vehicle and a display device comprises an illuminance detector for detecting an illuminance outside of the vehicle, and a lighting controller for controlling luminances of the headlights and the display device based on the detected illuminance. The lighting controller includes a headlight controlling module for turning the headlights off when the illuminance is above a first threshold, and turning the headlights on when the illuminance is the first threshold or below, and a display device controlling module for controlling the luminance of the display device to a first set value when the illuminance is above a second threshold, and controlling the luminance of the display device to a second set value when the illuminance is the second threshold or below, the second threshold being lower than the first threshold, the second set value being lower than the first set value.

7 Claims, 7 Drawing Sheets

(56) References Cited

U.S. PATENT DOCUMENTS

2016/0229331 A1* 8/2016 Adachi .................. B60Q 1/143

* cited by examiner

| LIGHT SWITCH POSITIONS | OFF | AUTO ON-OFF | ON |
|---|---|---|---|
| HEADLIGHTS | OFF | | ON |
| DISPLAY | BRIGHT | AUTOMATICALLY ON/OFF, BRIGHT/DARK | |
| SWITCH LIGHT(S) | OFF | | |

FIG. 3

| SURROUNDING BRIGHTNESS | BRIGHT | SLIGHTLY DARK | DARK |
| --- | --- | --- | --- |
| HEADLIGHTS | OFF | ON | ON |
| DISPLAY | BRIGHT | BRIGHT | DARK |
| SWITCH LIGHTING PARTS | OFF | ON | ON |

FIG. 4

VEHICLE LIGHTING CONTROL SYSTEM

BACKGROUND

The present invention relates to a vehicle lighting control system, particularly to a vehicle lighting control system which controls lighting of a display device (e.g., a display of a navigation system) mounted on a vehicle.

Conventionally, in display devices (e.g., displays of navigation systems) provided to instrument panels inside vehicles, the screen luminance is lowered in cooperation with turning on lights (e.g., headlights, small lights etc. of the vehicle) so that it does not get excessively bright for drivers while driving at night.

Note that JP2005-145115A discloses an art of turning off an interior lamp on a meter panel, for example, in cooperation with automatic turning on of headlights, in order to prevent the headlights from turning off unexpectedly.

However, for example in trucks such as delivery trucks and construction vehicles, and passenger vehicles which travel through a certain region of Europe and the United States of America, to improve safety while traveling, the vehicle may travel with the headlights turned on even in daytime when it is bright outside of the vehicle.

In this case, when the amount of light which comes into the vehicle lessens at dusk (when it becomes slightly dark outside of the vehicle) compared to the daytime, viewability of the outside of the vehicle improves by turning the headlights on; however, viewability of a display screen of the display device degrades due to lowered screen luminance of the display device inside the vehicle in cooperation with the turning on of the headlights.

SUMMARY

The present invention is made in view of the above issues, and aims to provide a vehicle lighting control system improved in viewability of inside and outside of a vehicle at dusk when it becomes slightly dark outside of the vehicle, etc.

According to one aspect of the present invention, a vehicle lighting control system for controlling headlights of a vehicle and a display device for displaying information of the vehicle toward a cabin of the vehicle, comprises an illuminance detector for detecting an illuminance outside of the vehicle, and a lighting controller for controlling luminances of the headlights and the display device based on the detected illuminance outside of the vehicle. The lighting controller includes a processor configured to execute a headlight controlling module for turning the headlights off when the illuminance outside of the vehicle is above a first threshold, and turning the headlights on when the illuminance outside of the vehicle is the first threshold or below, and a display device controlling module for controlling the luminance of the display device to a first set value when the illuminance outside of the vehicle is above a second threshold, and controlling the luminance of the display device to a second set value when the illuminance outside of the vehicle is the second threshold or below, the second threshold being lower than the first threshold, the second set value being lower than the first set value.

According to the above configuration, when the illuminance outside of the vehicle is above the first threshold, the headlights are turned off, whereas when the illuminance outside of the vehicle is the first threshold or below, the headlights are turned on. Further, when the illuminance outside of the vehicle is above the second threshold which is set lower than the first threshold, the luminance of the display device is controlled to be the first set value, whereas when the illuminance outside of the vehicle is the second threshold or below, the luminance of the display device is lowered to the second set value which is lower than the first set value. Therefore, at dusk when the illuminance outside of the vehicle is below the first threshold and above the second threshold, the headlights are turned on and the luminance of the display device is set to be high (bright). Thus, viewability of the inside and outside of the vehicle at dusk when it becomes slightly dark outside of the vehicle, etc. is improved.

The vehicle may include a switch light for illuminating a control switch inside the vehicle. The processor may be configured to execute a switch light controlling module for turning the switch light off when the illuminance outside of the vehicle is above the first threshold, and turning the switch light on when the illuminance outside of the vehicle is the first threshold or below.

According to the above configuration, when the illuminance outside of the vehicle is above the first threshold, the switch light is turned off, whereas when the illuminance outside of the vehicle is the first threshold or below, the switch light is turned on. Therefore, at dusk when the illuminance outside of the vehicle is below the first threshold and above the second threshold, the luminance of the display device is set to be high and the switch light of the control switch is turned on. Thus, the viewabilty of the inside of the vehicle, particularly the control switch, and the controllability of the control switch at dusk when it becomes slightly dark outside of the vehicle, etc., are further improved.

The vehicle may include a light switch for switching a state of the headlights to one of an OFF state, an automatic ON-OFF state, and an ON state. The display device controlling module may control the luminance of the display device according to the illuminance outside of the vehicle when the headlights are set to one of the ON and automatic ON-OFF states by the light switch.

According to the above configuration, when the headlights are set to the ON or automatic ON-OFF state by the light switch, the luminance of the display device is controlled according to the illuminance outside of the vehicle. Therefore, regardless of the headlights being in one of the ON and automatic ON-OFF states, the luminance of the display device is controlled according to the actual illuminance outside of the vehicle. Thus, the viewability of a display screen of the display device at dusk when the outside of the vehicle becomes slightly dark etc. is reliably improved.

The vehicle may include a light switch for switching a state of the headlights to one of an OFF state, an automatic ON-OFF state, and an ON state. The display device controlling module may control the luminance of the display device according to the illuminance outside of the vehicle when the headlights are set to the automatic ON-OFF state by the light switch.

The display device may be a display of a navigation system.

The display device may be a display disposed on an instrument panel of the vehicle.

The switch light may have a light source built in the control switch.

BRIEF DESCRIPTION OF THE DRAWINGS

FIG. 3 is a table illustrating a relationship of light switch positions with states of respective lights in the lighting control system of FIG. 1.

FIG. 4 is a table illustrating a relationship of brightness of the surrounding of the vehicle with states of the respective lights when the light switch position is automatic ON-OFF in the lighting control system of FIG. 1.

DETAILED DESCRIPTION OF EMBODIMENT

Hereinafter, a vehicle lighting control system according to one embodiment of the present invention is described with reference to FIGS. 1 to 7.

[System Configuration]

Figure 1:
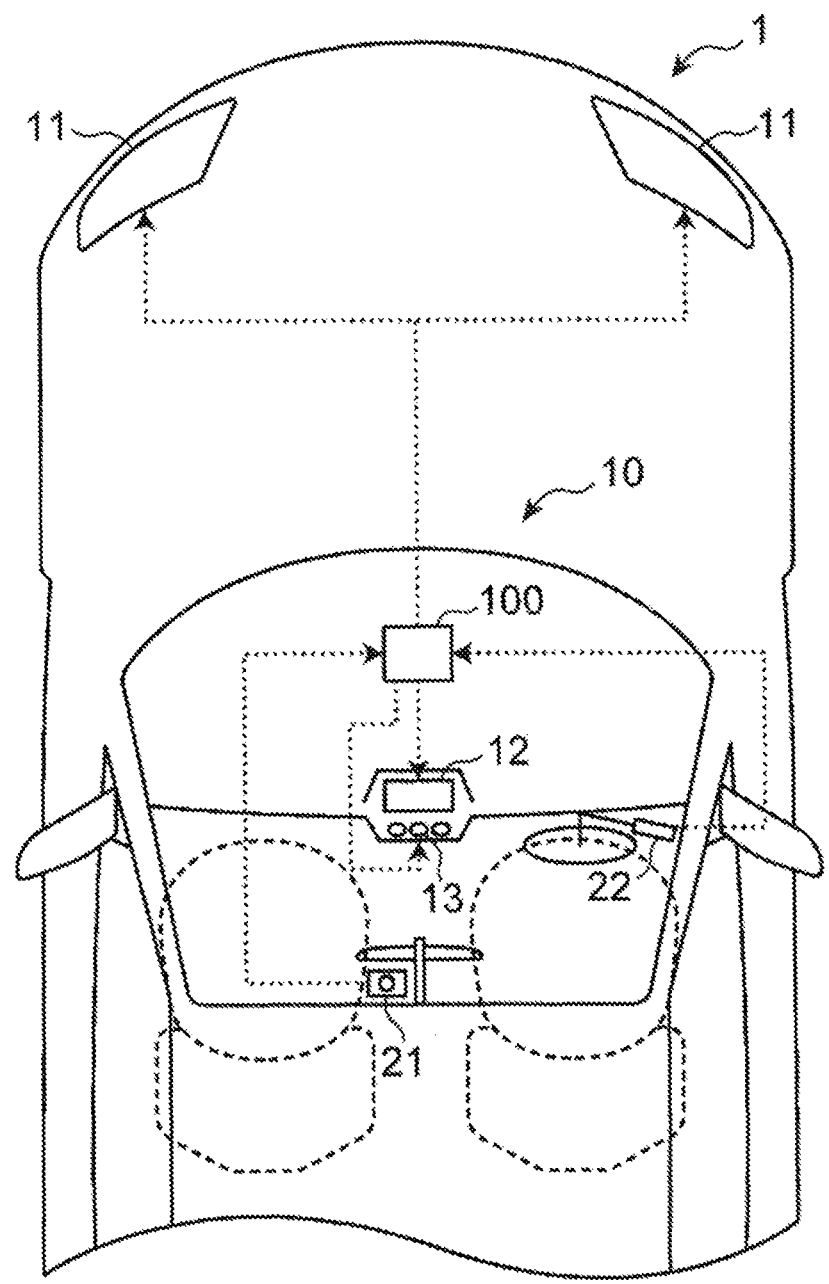
FIG. 1 is a schematic view illustrating a vehicle mounted with a lighting control system according to one embodiment of the present invention.

FIG. 1 is a schematic view illustrating a vehicle 1 mounted with a lighting control system 10 according to this embodiment. As illustrated in FIG. 1, the vehicle 1 is equipped with headlights 11 in both left and right front parts. An illuminance sensor 21 for detecting brightness of the surrounding of the vehicle, i.e., an illuminance outside of the vehicle (e.g., an illuminance of sunlight, moonlight, a street lamp, or a headlight of another vehicle) is attached to an upper part of a windshield of the vehicle 1. Further a light switch 22 for changing states of lights by being manually moved to one of light switch positions of OFF, automatic ON-OFF, and ON by a vehicle driver is provided near a steering wheel inside the vehicle.

Further the vehicle 1 is provided therein with various lightings. For example, a center part of an instrument panel inside the vehicle is provided with a display 12 as a display device of a navigation system, such as an LCD, and switch lights 13 as light sources built in a plurality of control switches for controlling various electric components, such as an air conditioner, a navigation system, and an audio device, respectively. It will be appreciated that the switch lights 13 may include individual light sources for each switch or may include multiple light sources, and may instead be built outside of the respective control switch to illuminate the control switch by shining onto its surface.

Additionally, although not illustrated, the vehicle 1 is provided therein with an instrument panel light for illuminating the electric components disposed on the instrument panel, a meter light for illuminating meters, a center console light for illuminating components disposed in a center console, a ceiling light, door handle lights for illuminating inner door handles for respective seats, a rear-view mirror light provided to a rear-view mirror, a floor light for illuminating a cabin floor area, etc.

The lighting control system 10 according to this embodiment controls the lightings of the headlights 11, the display 12, the switch lights 13 etc. provided to the vehicle 1 described above.

Figure 2:
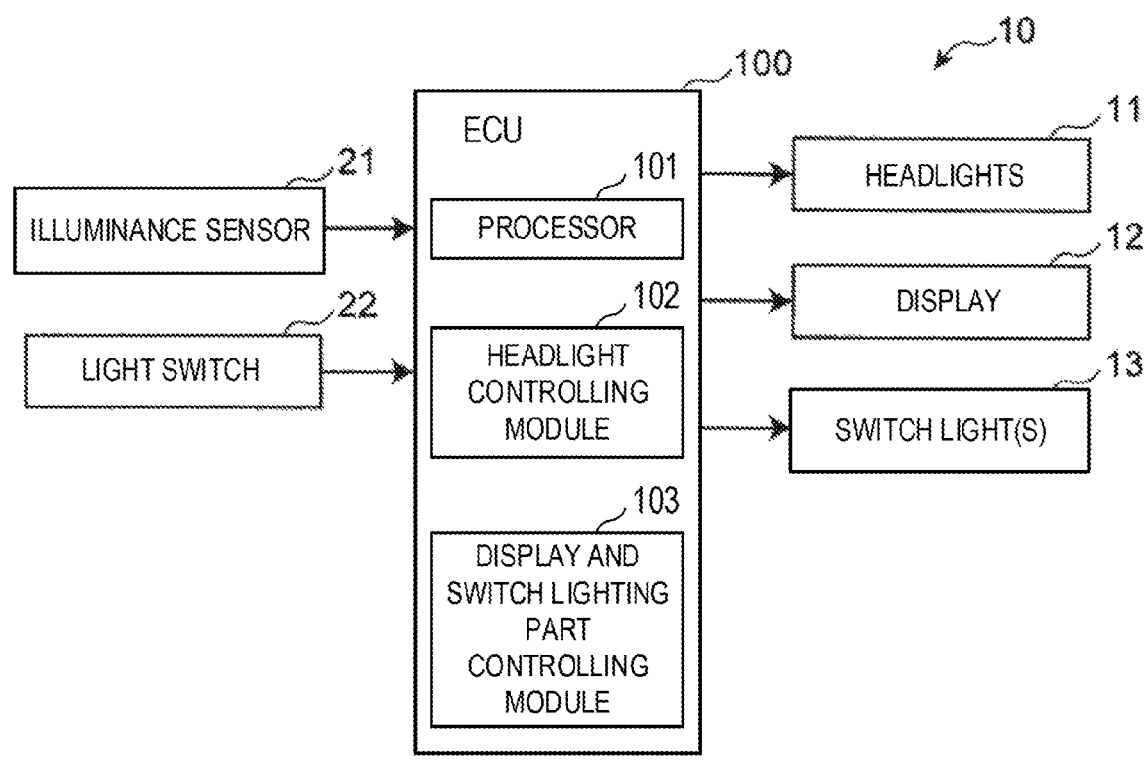
FIG. 2 is a block diagram of a structure of the lighting control system of FIG. 1.

FIG. 2 is a block diagram of a structure of the lighting control system 10 of this embodiment. As illustrated in FIG. 2, the lighting control system 10 includes an ECU (Electronic Control Unit) 100. The ECU 100 is connected with the illuminance sensor 21, the light switch 22, the headlights 11, the display 12, the switch lights 13, etc.

The ECU 100 is a controller for controlling the lightings of the headlights 11, the display 12, the switch lights 13 etc., comprised of a processor 101 configured to execute various control processes by implementing various programs as software modules stored in a ROM etc. The ECU 100 through the processor 101 implements functions of a headlight controlling module 102, a display and switch light controlling module 103, and other modules as described later, by executing the corresponding programs on the CPU.

The ECU 100 receives signals from the illuminance sensor 21 for detecting the illuminance outside of the vehicle, the light switch 22, etc. Further the ECU 100 outputs control signals to the headlights 11, the display 12, the switch lights 13, etc. based on the input signals from the illuminance sensor 21, the light switch 22, etc.

FIG. 3 is a table illustrating a relationship of the light switch positions with states of the respective lights. As illustrated in FIG. 3, ON/OFF states of the headlights 11 and the switch lights 13 and a bright/dark state of the display 12 are set according to the light switch positions of the light switch 22.

If the light switch position is OFF, the headlights 11 are in the OFF state, the switch lights 13 are also in the OFF state, and a display screen of the display 12 is set to be bright, i.e., have a high luminance.

If the light switch position is automatic ON-OFF, as illustrated in FIG. 4 described later, the headlights 11, the display 12, and the switch lights 13 are set according to the brightness of the surrounding detected by the illuminance sensor 21 (illuminance outside of the vehicle).

If the light switch position is ON, the headlights 11 are in the ON state, and the display 12 and the switch lights 13 are set according to the brightness of the surrounding as illustrated in FIG. 4.

FIG. 4 is a table illustrating a relationship of the brightness of the surrounding of the vehicle with states of the respective lights when the light switch position is automatic ON-OFF. As illustrated in FIG. 4, when the light switch position is automatic ON-OFF, the ON/OFF states of the headlights 11 and the switch lights 13 and the bright/dark state of the display 12 are set according to the brightness of the surrounding.

If the surrounding is bright, the headlights 11 and the switch lights 13 are in the OFF state, the display screen of the display 12 is set to be bright, i.e., have a high luminance.

If the surrounding is slightly dark, the headlights 11 and the switch lights 13 are in the ON state, the display screen of the display 12 is set to be bright, i.e., have a high luminance.

If the surrounding is dark, the headlights 11 and the switch lights 13 are in the ON state, the display screen of the display 12 is set to be dark, i.e., have a low luminance.

Here, with the display 12 as the LCD, it is possible to lower the brightness of the display screen of the display 12, i.e., the luminance of the display 12, by adjusting the brightness of a backlight thereof. Further, it may be achieved by softening the contrast (sharpness) of an image displayed on the display 12, or lowering the brightness of the image and displaying the image on the display 12.

Also when the light switch position is ON, similar to the case of the automatic ON-OFF described above, the bright/dark state of the display 12 and the ON/OFF state of the switch lights 13 are set according to the brightness of the surrounding.

[Lighting Controlling Method]

Next, a controlling method of the various lightings implemented by the ECU 100 of the lighting control system 10 is described with reference to FIGS. 5 to 7.

Figure 5:
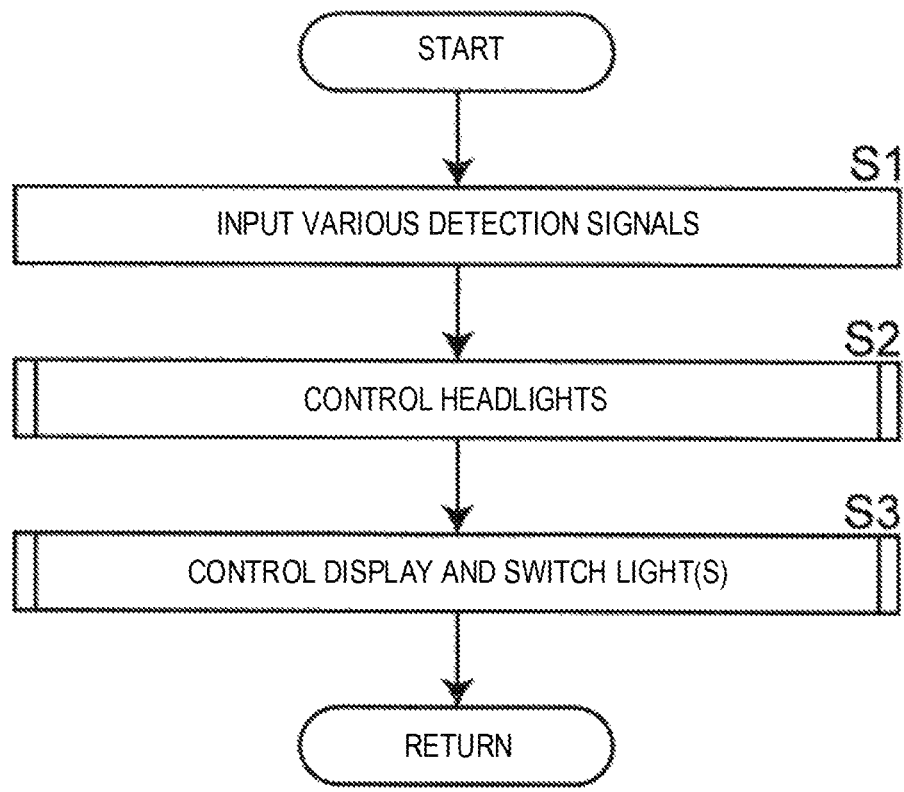
FIG. 5 is a flowchart illustrating a main routine of a lighting controlling method implemented by the lighting control system of FIG. 1.

First as illustrated in FIG. 5, for example, an engine start signal of an ignition switch (not illustrated) and various detection signals of the light switch position of the light switch 22 etc. are inputted to the ECU 100 (S1). Next the ECU 100 executes a subroutine of a headlight control based on the inputted detection signals (S2). Then the ECU 100 executes a subroutine of a display and switch light control based on the inputted detection signals etc. (S3), and then returns to S1.

Next, the subroutine of the headlight control of FIG. 5 which implements the headlight controlling module 102 of the ECU 100 is described with reference to FIG. 6.

Figure 6:
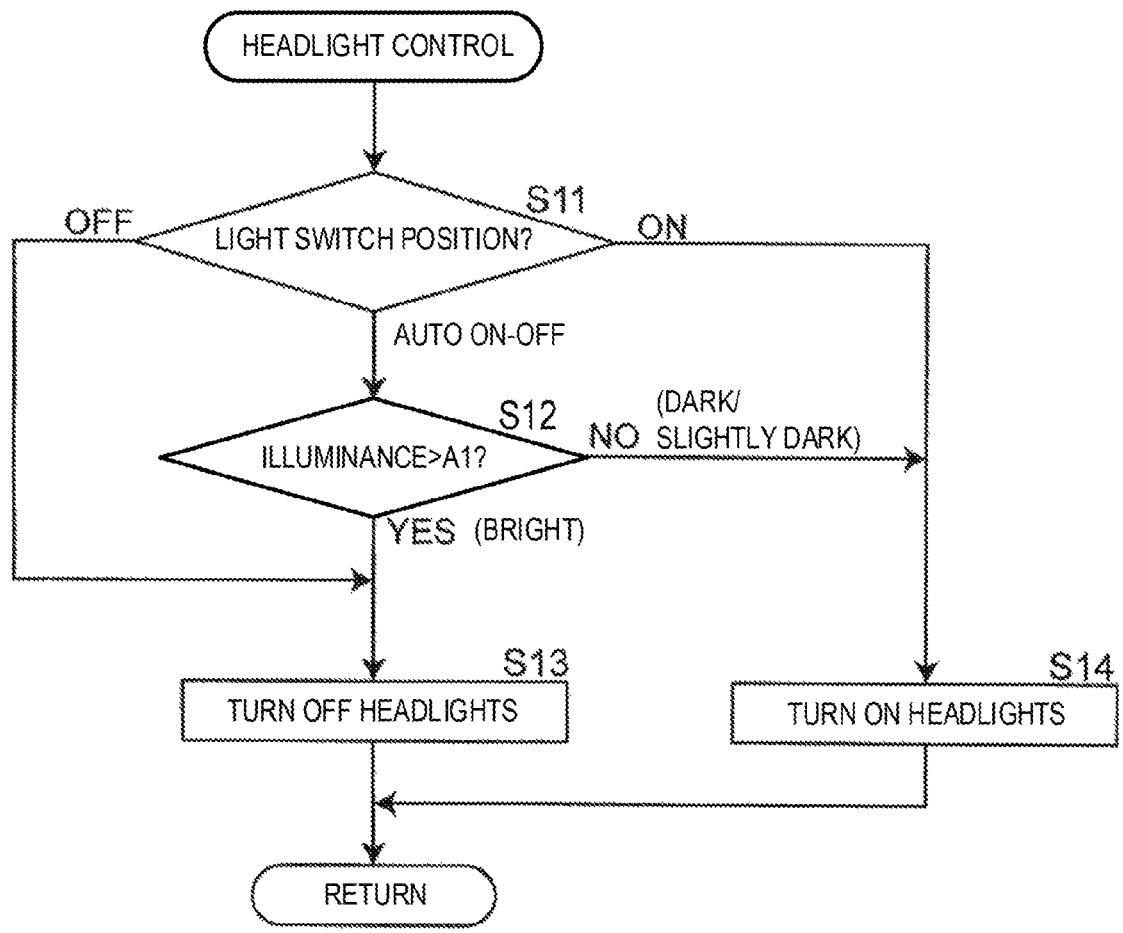
FIG. 6 is a flowchart illustrating a flow of a headlight control of FIG. 5.

As illustrated in FIG. 6, first the light switch position is determined among OFF, automatic ON-OFF, and ON (S11).

Next, if the light switch position is determined as automatic ON-OFF at S11, whether or not the illuminance outside of the vehicle detected by the illuminance sensor 21 is above a first threshold A1 is determined (S12).

At S12, if the surrounding of the vehicle is determined to be bright, i.e., if the illuminance outside of the vehicle is determined as above the first threshold A1, the headlights 11 are turned off (S13) and the flow returns to the main routine.

If the surrounding of the vehicle is determined to be dark or slightly dark, i.e., if the illuminance outside of the vehicle is determined as the first threshold A1 or below at S12, the headlights 11 are turned on (S14) and the flow returns to the main routine.

On the other hand, if the light switch position is determined as OFF at S11, the headlights 11 are turned off (S13) and the flow returns to the main routine.

If the light switch position is determined as ON at S11, the headlights 11 are turned on (S14) and the flow returns to the main routine.

Next, the subroutine of the display and switch light control of FIG. 5 which implements the display and switch light controlling module 103 of the ECU 100 is described with reference to FIG. 7.

Figure 7:
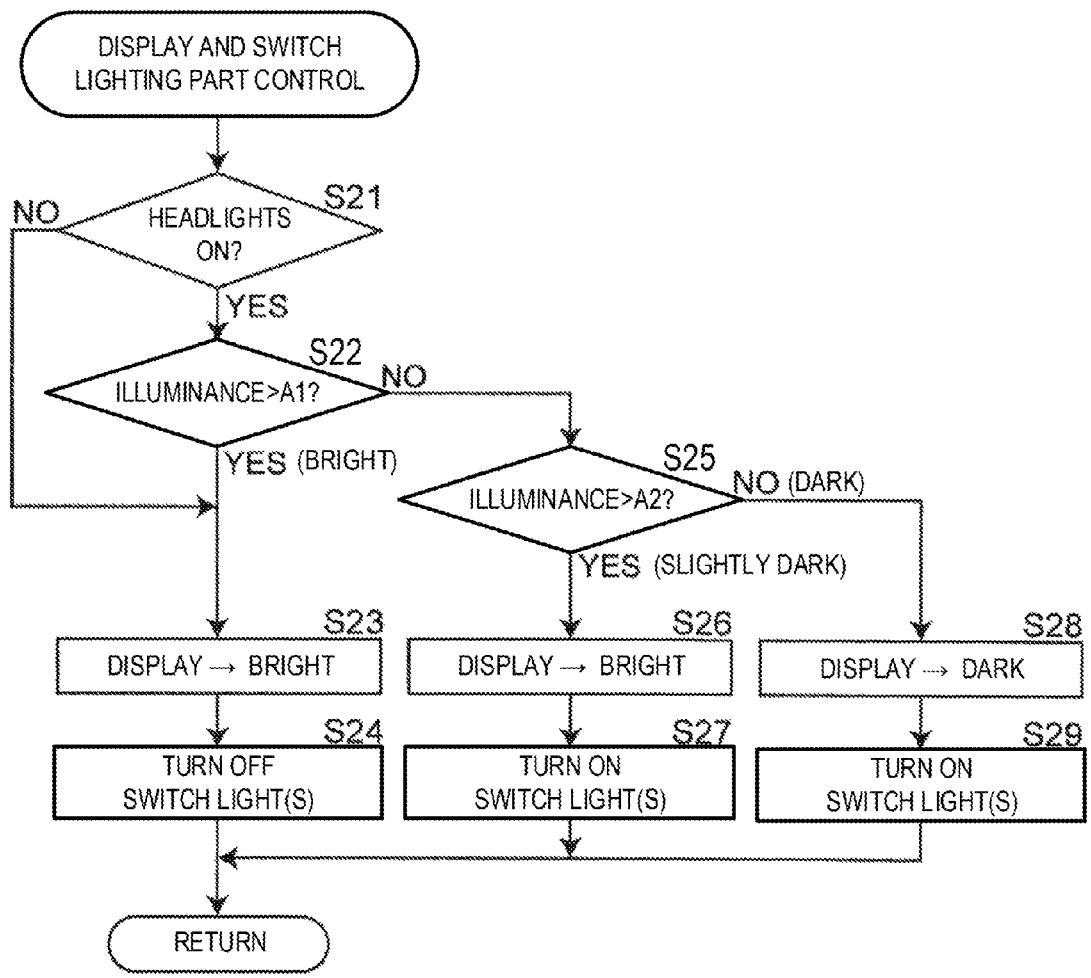
FIG. 7 is a flowchart illustrating a flow of a display and switch light control of FIG. 5.

As illustrated in FIG. 7, first whether or not the headlights 11 are in the ON state is determined (S21), and if the headlights 11 are determined to be in the ON state at S21, next, whether the illuminance outside of the vehicle is above the first threshold A1 is determined (S22). Here, the first threshold A1 of the illuminance outside of the vehicle is set to a lowest illuminance when the surrounding of the vehicle is bright.

If the illuminance outside of the vehicle is above the first threshold A1, i.e., the surrounding of the vehicle is determined to be bright, the display screen of the display 12 is set to be bright, i.e., the screen luminance is set to a first set value (S23), the switch lights 13 are turned off (S24), and the flow returns to the main routine.

If the headlights 11 are determined to be not in the ON state, i.e., is in the OFF state at S21, the display screen of the display 12 is set to be bright, i.e., the screen luminance is set to the first set value (S23), the switch lights 13 are turned off (S24), and the flow returns to the main routine.

On the other hand, at S22, if the illuminance outside of the vehicle is determined as the first threshold A1 or below, i.e., if the surrounding of the vehicle is determined to be slightly dark or dark, whether the illuminance outside of the vehicle is above a second threshold A2 is determined (S25). Here, the second threshold A2 is set to a highest illuminance when the surrounding of the vehicle is dark, which is below the first threshold A1. Therefore, when the illuminance outside of the vehicle is the first threshold A1 or below and above the second threshold A2, the surrounding of the vehicle is determined to be slightly dark.

If the illuminance outside of the vehicle is determined as above the second threshold A2, i.e., the surrounding of the vehicle is determined to be slightly dark at S25, the display screen of the display 12 is set to be bright, i.e., the screen luminance is set to the first set value (S26), the switch lights 13 are turned on (S27), and the flow returns to the main routine.

If the illuminance outside of the vehicle is determined as the second threshold A2 or below, i.e., the surrounding of the vehicle is determined to be dark at S25, the display screen of the display 12 is set to be dark, i.e., the screen luminance is set to a second set value which is below the first set value (S28), the switch lights 13 are turned on (S29), and the flow returns to the main routine.

Thus, according to this embodiment, the following operations and effects are exerted.

According to this embodiment, when the illuminance outside of the vehicle is above the first threshold, the headlights 11 are turned off, whereas when the illuminance outside of the vehicle is the first threshold or below, the headlights 11 are turned on. Further when the illuminance outside of the vehicle is above the second threshold which is set lower than the first threshold, the luminance of the display 12 is controlled to be the first set value, whereas when the illuminance outside of the vehicle is the second threshold or below, the luminance of the display 12 is lowered to the second set value which is lower than the first set value. Therefore, at dusk when the illuminance outside of the vehicle is below the first threshold and above the second threshold, the headlights 11 are turned on and the luminance of the display 12 is set to be high (bright). Thus, viewability of the inside and outside of the vehicle at dusk when the outside of the vehicle becomes slightly dark, etc. is improved.

Further according to this embodiment, when the illuminance outside of the vehicle is above the first threshold, the switch lights 13 are turned off, whereas when the illuminance outside of the vehicle is the first threshold or below, the switch lights 13 are turned on. Therefore, at dusk when the illuminance outside of the vehicle is below the first threshold and above the second threshold, the luminance of the display 12 is set to be high and the luminance of the switch lights 13 of the control switches is set to be high. Thus, the viewabilty of the inside of the vehicle, particularly the control switches, and the controllability of the control switches at dusk when it becomes slightly dark outside of the vehicle etc. are further improved.

Further according to this embodiment, when the headlights 11 are set to the ON or automatic ON-OFF state by the light switch, the luminance of the display 12 is controlled according to the illuminance outside of the vehicle. Therefore, regardless of the headlights 11 being in the ON or automatic ON-OFF state, the luminance of the display 12 is controlled according to the actual illuminance outside of the vehicle. Thus, the viewability of the display screen of the display 12 at dusk when it becomes slightly dark outside of the vehicle etc. is reliably improved.

Note that the present invention is not limited to the above illustrative embodiment, and without departing from the scope of the present invention, various enhancements and various changes in design may be made.

For example, in the above embodiment, the display 12 of the navigation system is illustratively described as the display device; however, it is not limited to this. For example, the display device may display a meter screen regarding a traveling state of the vehicle, such as a current vehicle speed and an engine speed, a warning screen to notify an abnormality of the vehicle and/or electric components, etc.

Moreover in the above embodiment, the light sources built in the control switches are illustratively described as the switch lights 13; however, it is not limited to this. Lights each of which is a light source disposed outside of a corresponding control switch and emits light to the control switch from outside may be applied. Specifically, the switch lights 13 may include any of the instrument panel light for illuminating the electric components provided to the instrument panel, the meter light for illuminating the meters, the center console light for illuminating the components disposed in the center console, the ceiling light, the door handle lights for illuminating the inner door handles of the respective seats, the rear-view mirror light provided to the rear-view mirror, the floor light for illuminating the cabin floor area, etc.

Moreover in the above embodiment, the dusk is described as an example of when it becomes slightly dark outside of the vehicle; however, it is not limited to this. Further examples of when it becomes slightly dark outside of the vehicle may include when the vehicle is in a tunnel or at dawn (twilight).

Moreover in the above embodiment, the case where the display is controlled according to the illuminance outside of the vehicle when the light switch 22 is set to the automatic ON-OFF or ON state is described; however, it is not limited to this. For example, the light switch 22 may similarly be controlled only when the light switch 22 is set to the automatic ON-OFF state.

Moreover in the above embodiment, the display and switch light controlling module 103 is described as a single component; however, it is not limited to this. For example, the display device controlling module and the switch light controlling module may be separately provided.

As described above, according to the present invention, the viewability of the inside and outside of the vehicle at dusk when the outside of the vehicle becomes slightly dark, etc. is improved. Therefore, the present invention is suitably usable in the industrial fields of manufacturing vehicle lighting control systems and vehicles mounted with the same.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
10 Lighting Control System
11 Headlight
12 Display (Display Device)
13 Switch Light
21 Illuminance Sensor (Illuminance Detector)
22 Light Switch
100 ECU (Lighting Controller)

What is claimed is:

1. A vehicle lighting control system for controlling headlights of a vehicle and a display device for displaying information of the vehicle toward a cabin of the vehicle, comprising:
    an illuminance detector for detecting an illuminance outside of the vehicle; and
    a lighting controller for controlling luminances of the headlights and the display device based on the detected illuminance outside of the vehicle,
    wherein the lighting controller includes a processor configured to execute:
        a headlight controlling module for turning the headlights off when the illuminance outside of the vehicle is above a first threshold, turning the headlights on when the illuminance outside of the vehicle is the first threshold or below, and turning the headlights on and controlling the luminance of the display device to a second value when the illuminance outside of the vehicle is below the first threshold and above a second threshold; and
        a display device controlling module for controlling the luminance of the display device to a first value when the illuminance outside of the vehicle is above the second threshold, and controlling the luminance of the display device to the second value when the illuminance outside of the vehicle is the second threshold or below, the second threshold being lower than the first threshold, the second value being darker than the first value.

2. The vehicle lighting control system of claim 1, wherein the vehicle includes a switch light for illuminating a control switch inside the vehicle, and
    wherein the processor is configured to execute a switch light controlling module for turning the switch light off when the illuminance outside of the vehicle is above the first threshold, and turning the switch light on when the illuminance outside of the vehicle is the first threshold or below.

3. The vehicle lighting control system of claim 2, wherein the switch light has a light source built in the control switch.

4. The vehicle lighting control system of claim 1, wherein the vehicle includes a light switch for switching a state of the headlights to one of an OFF state, an automatic ON-OFF state, and an ON state, and
    wherein the display device controlling module controls the luminance of the display device according to the illuminance outside of the vehicle when the headlights are set to one of the ON and automatic ON-OFF states by the light switch.

5. The vehicle lighting control system of claim 1, wherein the vehicle includes a light switch for switching a state of the headlights to one of an OFF state, an automatic ON-OFF state, and an ON state, and
    wherein the display device controlling module controls the luminance of the display device according to the illuminance outside of the vehicle when the headlights are set to the automatic ON-OFF state by the light switch.

6. The vehicle lighting control system of claim 1, wherein the display device is a display of a navigation system.

7. The vehicle lighting control system of claim 1, wherein the display device is a display disposed on an instrument panel of the vehicle.

* * * * *